Patented Mar. 2, 1926.

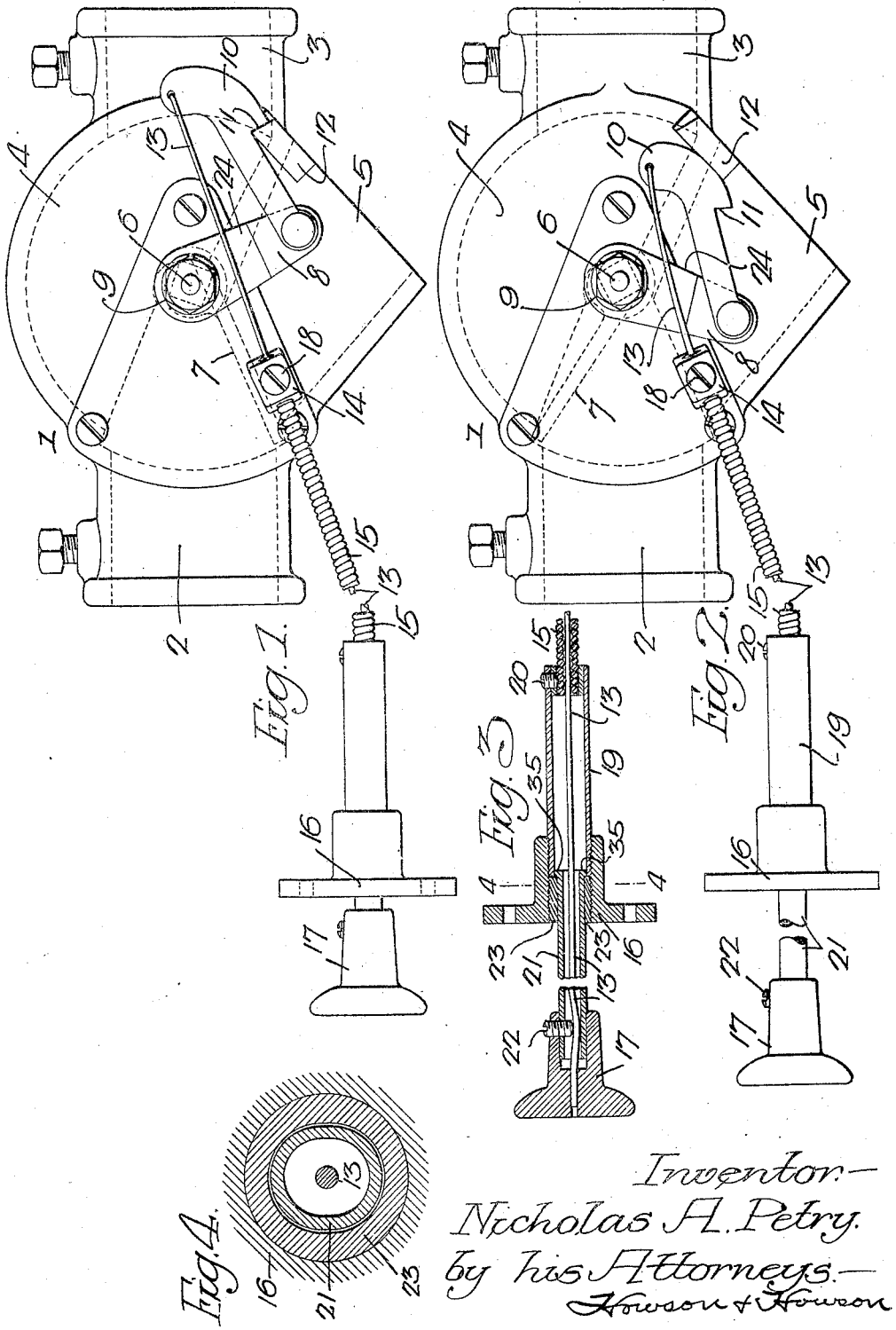

1,575,500

UNITED STATES PATENT OFFICE.

NICHOLAS A. PETRY, OF PHILADELPHIA, PENNSYLVANIA.

VALVE LATCH.

Application filed June 23, 1923. Serial No. 647,365.

*To all whom it may concern:*

Be it known that I, NICHOLAS A. PETRY, a citizen of the United States, residing in Philadelphia, Pennsylvania, have invented Valve Latches, of which the following is a specification.

The principal object of my invention is to provide a novel form of hand-actuated latch, so constructed that while conveniently adjustable into and out of its locked position, it cannot be operated by force applied to the member which it is designed to lock.

This object and other advantageous ends, I attain as hereinafter set forth, reference being had to the accompanying drawings, in which, Fig. 1 is a side elevation illustrating my invention as applied to a cut-out valve to hold this in the closed position;

Fig. 2 is an elevation similar to Fig. 1 but showing the parts in the positions occupied when the valve is open;

Fig. 3 is a longitudinal vertical section illustrating the operating handle and certain of the parts associated therewith;

Fig. 4 is a transverse section on the line 4—4, Fig. 3, showing on an enlarged scale the detail construction of certain of the parts.

In Figs. 1 to 4 of the above drawings, 1 represents a well-known form of cut-out valve having an inlet 2 designed to be connected to the exhaust manifold of an internal combustion engine and also having, in line with said inlet, an outlet 3 for connection with a muffler. Between said inlet and outlet is a valve casing or body 4 made in the form of a cylindrically curved hollow structure having an atmospheric outlet or branch 5, projecting from its lower portion. Coaxially mounted within the body 4 is a spindle 6 carrying a substantially rectangular plate 7 which constitutes the movable element of the valve and by turning said spindle, this plate may be adjusted from the position shown in Fig. 1, in which it closes the branch 5 and permits the flow of gases from the inlet 2 to the muffler branch 3, to the position shown in Fig. 2 in which gases entering the inlet 2 are compelled to pass directly into the atmospheric outlet branch 5, to the exclusion of the muffler branch 3.

Obviously, the detail construction of the cut-out valve is immaterial but in order to actuate its movable element 7 and positively lock it in a position closing the atmospheric exhaust branch 5, I provide the parts hereinafter described. These comprise an arm 8 rigidly fastened to the spindle 6 in any suitable manner, as by means of a retaining nut 9, and extending at right angles to the spindle. On its outer or free end is pivotally mounted a latch hook 10, consisting of an arm having an angular notch 11 designed to engage an angular lug or abutment 12 projecting from the valve casing 4. When the movable valve element 7 is in the closed position shown in Fig. 1, the hook latch 10 projects in a line substantially at right angles to the line of the arm 8 into engagement with the lug and any force tending to rotate said latter arm in a clockwise direction, acts only to cause said latch to more closely and firmly engage said lug 12. For this purpose, the portion of said lug or abutment 12, fitting the notch 11, as well as the notch itself, has an angular form somewhat less than 90°, so that suction upon the valve element 7 cannot disengage the latch from its lug so as to permit opening of said element.

For actuating the hook latch 10, I provide a longitudinally adjustable, flexible wire 13 having one end attached to the free or outer end of the hook latch 10 and extending through a guide 14, a tube 15 and an escutcheon plate 16 to an operating handle 17. The guide 14 is preferably made in the form of a post mounted on and projecting from the valve casing 4 and having a passage in which one end of the flexible guide tube 15 is clamped by means of a set screw 18. The escutcheon plate 16 may be mounted at any suitable point distant from the cut-out valve, usually on the dash board of the motor vehicle, and has fastened to it the second end of the guide tube 15. In accordance with my invention, said plate is formed with a flanged opening into which is fixed one end of a tube 19 detachably clamped to the flexible tube 15 by a set screw 20.

The operating handle 17 consists of a head having axially mounted in it a tube 21 longitudinally slidable within the tube 19 of the escutcheon plate, and said head is preferably longitudinally perforated so that the wire 13 may be extended through it;—being rigidly, as well as adjustably connected to it by a set screw 22 which also connects it with the tube 21.

By making the handle 17 with a through hole, as shown in Fig. 2, it is possible to run the wire 13 through it and properly adjust the length of said wire to obtain the best operative adjustment before tightening the set screw 23 and finally cutting off the surplus portion of the outer end of said wire.

In order to effectually lock the wire 13 with the parts attached thereto in any adjusted position, I preferably make the tube 21 of an external section other than circular and usually give it a substantially elliptical form, providing the escutcheon plate 10 with bushing 23 having an opening of other than circular form for the reception of said tube. As a consequence of this construction, while the tube 21 may be freely moved longitudinally through said bushing when the parts occupy certain relative positions, a slight turning of the handle 17 with the tube 21 will cause the latter to jam or bind in the bushing 23, thus effectually preventing longitudinal movement of the tube 21 and wire 13. Reverse rotation of the head or handle 17 will free the tube 21 from the bushing 23 and thereafter permit the easy longitudinal movement of said tube with its attached parts. This operating device for the latch and valve form the subject of my application for operating devices for valves and the like, Serial No. 11,210, filed Feb. 24, 1925, as a continuation in part of this present application.

When, therefore it is desired to open the cut-out valve, the handle 17 is drawn away from the escutcheon plate 16, so that the wire 13 is moved longitudinally, with the result that it swings the hook latch 10 upwardly away from the lug or abutment 12. The resistance of the wire 13 to lateral bending serves to limit the swinging movement of the latch. Thereafter the continued longitudinal movement of the head 17 with the tube 21 and wire 13 will swing said arm 8 in the case illustrated in a clockwise direction, into the position shown in Fig. 2, in which the muffler branch 3 is closed and direct communication is established between the inlet 2 and atmospheric exhaust branch 5. By giving the handle 17 and tube 21 a slight rotary movement, said tube may now be caused to jam on the bushing 23, whereupon the parts are positively held in place.

In order to close the cut-out valve, the handle 17 is first slightly turned in a direction the reverse of that above noted, to release the tube 21 from the bushing 23, after which a movement of the head toward the escutcheon plate 16 will move the wire 13 longitudinally. Through the latch arm 10 and arm 8, the valve element 7 is closed and thereafter the notch 11 of said latch arm is caused to engage the angular edge of the lug 12. The resistance of the wire 13 to lateral bending will now tend to maintain said latch in engagement with the lug so that the valve element 7 cannot become unseated or chatter as might be the case if it was not positively held. If desired, the handle 17 may now be again slightly rotated so as to lock the tube 21 to the bushing 23, although this is not ordinarily necessary when the latch engages the lug. It will be understood that since the entire length of the tube 21 which co-acts with the bushing 23, is of elliptical or other than circular form, said tube may be caused to grip the bushing in any longitudinally adjusted position, and consequently the wire 13, with its attached parts, may likewise be rigidly held not only in either of the extreme positions but may likewise be held or locked in any intermediate position.

I claim:

1. The combination of a valve casing, a pivoted valve member in the casing, an arm connected to the valve member for swinging it on its pivot, a hook pivoted to the arm, an abutment on the casing adapted to be engaged by the hook, and means for swinging the hook into and out of locking engagement with the said abutment.

2. The combination of a valve casing, a pivoted valve member in the casing, an arm connected to the valve member for swinging it on its pivot, a hook pivoted to the arm, an abutment on the casing adapted to be engaged by the hook, and means for swinging the hook relatively to the arm out of engagement with the abutment and for also moving the arm.

3. The combination of a rotatably mounted valve member; an operating arm therefor; a hooked latch pivotally mounted on said arm; a relatively fixed abutment positioned to engage the latch when the valve is in a definite position; and a member for successively freeing the latch from the abutment and thereafter turning the arm to operate the valve.

4. The combination of a rotatably mounted valve member; an operating arm therefor; a hooked latch pivotally mounted on said arm; a relatively fixed abutment positioned to engage the latch when the valve is in a definite position; and a member for successively freeing the latch from the abutment and thereafter turning the arm to operate the valve and lock it.

5. The combination of a valve casing, a valve spindle rotatably mounted therein; a valve on said spindle; an operating arm connected to the spindle; a hooked latch mounted on the arm; an abutment positioned to be engaged by the latch when the valve is in a definite position; and a longitudinally movable member connected to swing the latch on the arm and also to turn the spindle with the valve.

6. The combination of a valve casing, a pivoted valve member in the casing, an arm connected to the valve member for swinging it on its pivot, a hook pivoted to the arm, an abutment on the casing adapted to be engaged by the hook, and a member connected with the hook to exert force along a line at one side of the pivotal connection with the arm, whereby the hook is first swung out of engagement with the abutment and thereafter moves the arm.

7. The combination of a valve casing, a pivoted valve member in the casing, an arm connected to the valve member for swinging it on its pivot, a hook pivoted to the arm, an abutment on the casing adapted to be engaged by the hook, and a member connected with the hook to exert force in either direction along a line at one side of the pivotal connection with the arm, whereby the hook is first swung out of engagement with the abutment and thereafter moves the arm or whereby the hook first moves the arm and is thereafter swung into engagement with the abutment.

8. The combination of a valve casing, a pivoted valve member in the casing, an arm connected to the valve member for swinging it on its pivot, a pivoted hook and a cooperating abutment for locking the valve in one position, and means supplemental to the hook and movably connected therewith for holding it in locking engagement with the abutment.

9. The combination of a valve casing a pivoted valve member in the casing, an arm connected to the valve member for swinging it on its pivot, a hook pivoted to the arm, an abutment on the casing adapted to be engaged by the hook, a relatively stiff wire connected to the hook and serving by continuous movement in one direction to swing the hook relatively to the arm out of engagement with the abutment and to also move the arm, and a guide for the wire whereby the lateral resistance thereof serves to limit the swinging movement of the hook.

10. The combination of a valve casing, a pivoted valve member in the casing, an arm connected to the valve member for swinging it on its pivot, a hook pivoted to the arm, an abutment on the casing adapted to be engaged by the hook, a relatively stiff wire connected to the hook and serving by continuous movement in one direction to move the arm and also to swing the hook relatively to the arm into engagement with the abutment, and a guide for the wire whereby the lateral resistance thereof serves to assist in holding the hook in engagement with the abutment.

11. The combination of a valve casing, a pivoted valve member in the casing, an arm connected to the valve member for swinging it on its pivot, a hook pivoted to the arm, an abutment on the casing adapted to be engaged by the hook, a relatively stiff wire connected to the hook and serving by continuous movement in one direction to swing the hook relatively to the arm out of engagement with the abutment and to also move the arm, and also serving by continuous movement in the other direction to move the arm and also to swing the hook relatively to the arm into engagement with the abutment, and a guide for the wire whereby the lateral resistance thereof serves to limit the swinging movement of the hook away from the abutment and also serves to assist in holding the hook in engagement with the abutment.

12. The combination of a valve casing, a pivoted valve member in the casing, an arm connected to the valve member for swinging it on its pivot, a pivoted hook and a cooperating abutment for locking the valve in one position, and means in addition to the hook for holding the valve member against movement in either direction when the hook is disengaged from the abutment.

13. The combination of a valve casing, a pivoted valve member in the casing, an arm connected to the valve member for swinging it on its pivot, a pivoted hook and a cooperating abutment for locking the valve in one position, and means in addition to the hook for holding the valve member in any desired position of adjustment and for preventing movement in either direction when the hook is disengaged from the abutment.

14. The combination of a valve member; a hook connected to said valve member; an abutment; a longitudinally movable member for moving said hook into and out of holding engagement with said abutment; with a device for locking the last said member from movement and through the latter holding said hook in its abutment engaging position.

15. The combination of a valve member; a hook connected to said valve member; an abutment; a relatively stiff wire connected to said hook for moving it into and out of engagement with said abutment and operating the valve member; with means for holding said wire from longitudinal and lateral movement with the hook in its abutment-engaging position.

16. The combination of a valve member; an operating arm thereof; a hooked member pivoted on said arm; an abutment positioned to be engaged by said hooked member to hold the valve in a locked position; a wire connected to the hooked member; and means for locking said wire at will from longitudinal movement and preventing turning of the hooked member on its pivot.

NICHOLAS A. PETRY.